US011515903B2

(12) United States Patent
Ross, III

(10) Patent No.: US 11,515,903 B2
(45) Date of Patent: Nov. 29, 2022

(54) SIGNAL LEVEL INDICATORS AND ANTENNA ASSEMBLIES INCLUDING THE SAME

(71) Applicant: Antennas Direct, Inc., Ellisville, MO (US)

(72) Inventor: John Edwin Ross, III, Moab, UT (US)

(73) Assignee: Antennas Direct, Inc., Ellisville, MO (US)

( * ) Notice: Subject to any disclaimer, the term of this patent is extended or adjusted under 35 U.S.C. 154(b) by 0 days.

(21) Appl. No.: 17/398,632

(22) Filed: Aug. 10, 2021

(65) Prior Publication Data
US 2022/0069857 A1 Mar. 3, 2022

Related U.S. Application Data

(60) Provisional application No. 63/070,060, filed on Aug. 25, 2020.

(51) Int. Cl.
*H04B 1/16* (2006.01)
*H04B 17/318* (2015.01)

(52) U.S. Cl.
CPC ............. *H04B 1/16* (2013.01); *H04B 17/318* (2015.01)

(58) Field of Classification Search
CPC ............................... H04B 1/16; H04B 17/318
See application file for complete search history.

(56) References Cited

U.S. PATENT DOCUMENTS

| 5,754,962 | A | 5/1998 | Griffin |
| 7,181,184 | B1* | 2/2007 | Dimeo ................. H04B 1/1036 455/286 |
| 8,299,962 | B2 | 10/2012 | Le Sage |
| 8,340,164 | B2 | 12/2012 | Gessner |
| 8,401,488 | B2 | 3/2013 | Sulkowski, Jr. et al. |
| 8,531,267 | B2 | 9/2013 | Andersen |
| 8,634,823 | B2 | 1/2014 | Le Sage |
| 8,954,011 | B2 | 2/2015 | De Flaviis et al. |
| 9,046,601 | B2 | 6/2015 | Le Sage |
| 9,306,683 | B2 | 4/2016 | Pikelja et al. |
| 9,337,941 | B2 | 5/2016 | Emerson et al. |
| 9,485,041 | B1 | 11/2016 | Huang |
| 9,503,205 | B1* | 11/2016 | Huang ................. H04B 17/318 |
| 9,859,999 | B2 | 1/2018 | Joly et al. |

(Continued)

FOREIGN PATENT DOCUMENTS

TW 200735544 A 9/2007
TW 202025722 A 7/2020

OTHER PUBLICATIONS

Taiwan Office Action for TW110129647 that claims priority to the instant application; dated Jul. 11, 2022; 9 pages.

*Primary Examiner* — Janice N Tieu
(74) *Attorney, Agent, or Firm* — Harness, Dickey & Pierce, P.L.C.; Anthony G. Fussner

(57) ABSTRACT

Exemplary embodiments are disclosed of signal level indicators and antenna assemblies including the same. In an exemplary embodiment, an antenna assembly includes an antenna configured to be operable for receiving signals, a signal level indicator for indicating a strength of signals received by the antenna, and an amplifier coupled for communication with the antenna, the signal level indicator, and a signal output. The amplifier is configured to be operable for amplifying signals received by the antenna.

20 Claims, 10 Drawing Sheets

(56) References Cited

U.S. PATENT DOCUMENTS

| | | |
|---|---|---|
| 10,020,900 B2 | 7/2018 | Neel et al. |
| 10,135,553 B2 | 11/2018 | Perndl et al. |
| 10,432,331 B1 * | 10/2019 | Lo .......................... H03H 7/12 |
| 10,547,396 B2 | 1/2020 | Ohmae et al. |
| 10,693,572 B2 | 6/2020 | Gallhauser et al. |
| 2005/0159125 A1 | 7/2005 | Lodolo et al. |
| 2007/0218944 A1 | 9/2007 | Lin |
| 2011/0019100 A1 | 1/2011 | Lo |
| 2012/0154687 A1 * | 6/2012 | Yang ..................... H01Q 5/314 |
| | | 343/702 |
| 2015/0160264 A1 | 6/2015 | Rada et al. |
| 2020/0083970 A1 | 3/2020 | Lemire et al. |

* cited by examiner

SIGNAL LEVEL INDICATORS AND ANTENNA ASSEMBLIES INCLUDING THE SAME

CROSS-REFERENCE TO RELATED APPLICATION

This application claims priority to and the benefit of U.S. Provisional Patent Application No. 63/070,060 filed Aug. 25, 2020, the entire disclosure of which is incorporated herein by reference.

FIELD

The present disclosure relates to signal level indicators and antennas assemblies including the same.

BACKGROUND

The statements in this section merely provide background information related to the present disclosure and may not constitute prior art.

Many people enjoy watching television. Recently, the television-watching experience has been greatly improved due to high definition television (HDTV). A great number of people pay for HDTV through their existing cable or satellite TV service provider. In fact, many people are unaware that HDTV signals are commonly broadcast over the free public airwaves. This means that HDTV signals may be received for free with the appropriate antenna.

DRAWINGS

The drawings described herein are for illustration purposes only and are not intended to limit the scope of the present disclosure in any way.

Corresponding reference numerals may indicate corresponding (although not necessarily identical) parts throughout the several views of the drawings.

DETAILED DESCRIPTION

The following description is merely exemplary in nature and is in no way intended to limit the present disclosure, application, or uses.

Disclosed are exemplary embodiments of signal level indicators for indicating strength of signals (e.g., wireless signals, over-the-air (OTA) signals, antenna signals, digital television signals, HDTV signals, etc.). In exemplary embodiments, the signal level indicator (SLI) may comprise components (e.g., detector, LEDs or other display components, etc.) mounted on a printed circuit board (PCB). Also disclosed are exemplary embodiments of antennas assemblies that include (e.g., combined with, integrated with, etc.) signal level indicators for indicating strength of signals received by the antenna assemblies.

In exemplary embodiments, an antenna assembly may include a Very High Frequency (VHF) antenna element and an Ultra High Frequency (UHF) antenna element configured to be operable for receiving VHF and UHF high definition television signals. And, the signal level indicator may be configured for indicating a strength of the VHF and UHF high definition television signals received by the antenna assembly. For example, the signal level indicator may include a display (e.g., one or more light emitting diodes (LEDs), etc.) configured to display a corresponding signal strength indication according to the received signal strength of the antenna assembly.

Figure 1:
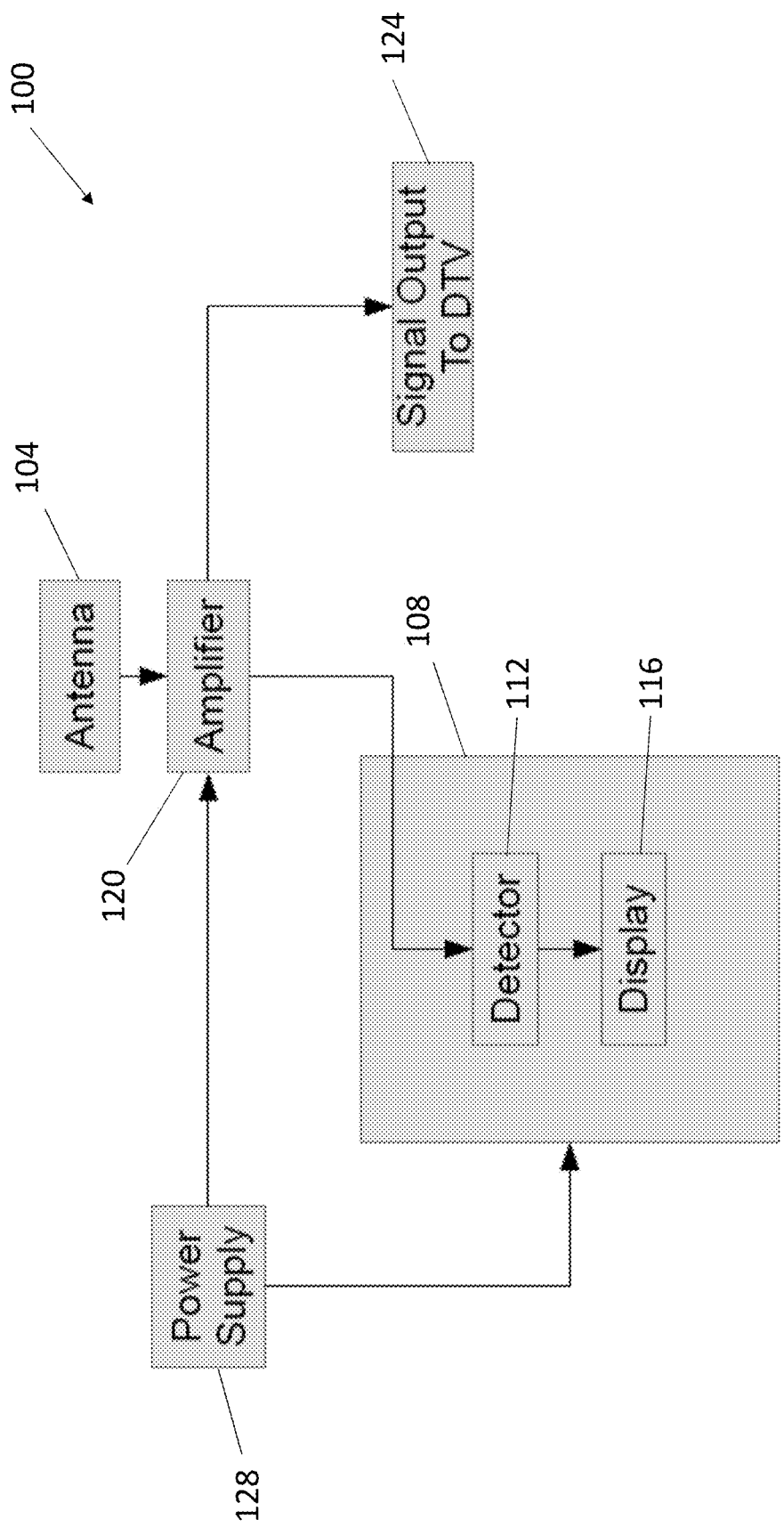
FIG. 1 illustrates an antenna assembly including a signal level indicator (SLI) according to a first exemplary embodiment.

With reference now to the figures, FIG. 1 illustrates an exemplary embodiment of an antenna assembly 100 embodying one or more aspects of the present disclosure. The antenna assembly 100 includes an antenna 104 and a signal level indicator (SLI) 108, which is configured to indicate a strength of signals received by the antenna 104.

The signal level indicator 108 includes a detector 112 and a display 116. An amplifier 120 is coupled between and in communication with the antenna 104, the signal level indicator 108, and signal output 124. A power supply 128 may be configured to provide power for the signal level indicator 108 and the amplifier 120. The amplifier 120 may be configured to be operable for amplifying signals received by the antenna 104 before the amplified signals are transmitted from the amplifier 120 to the signal level indicator 108 and the signal output 124.

By way of example, the antenna 104 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 100 may be used for receiving digital television signals (of which high definition television (HDTV) signals are a subset) and communicating the received signals to an external device, such as a television. A coaxial cable may be used for transmitting signals received by the antenna assembly 100 to the television.

In this example, the antenna 104 and amplifier 120 may be configured to naturally have low pass and high pass functionality according to geometry. The antenna 104 may be tuned (e.g., shaped, sized, etc.) for digital television (DTV) bands such that other signals are naturally attenuated.

In which case, this exemplary embodiment may not require high pass and low pass filter stages, as the antenna may instead be relied upon as a filter. By allowing for the elimination of the use of a combination of low pass and high pass filters to remove signals not associated with DTV from the signal level indicator (SLI) signal path, this exemplary embodiment may allow for reduced costs and complexity.

Figure 2:
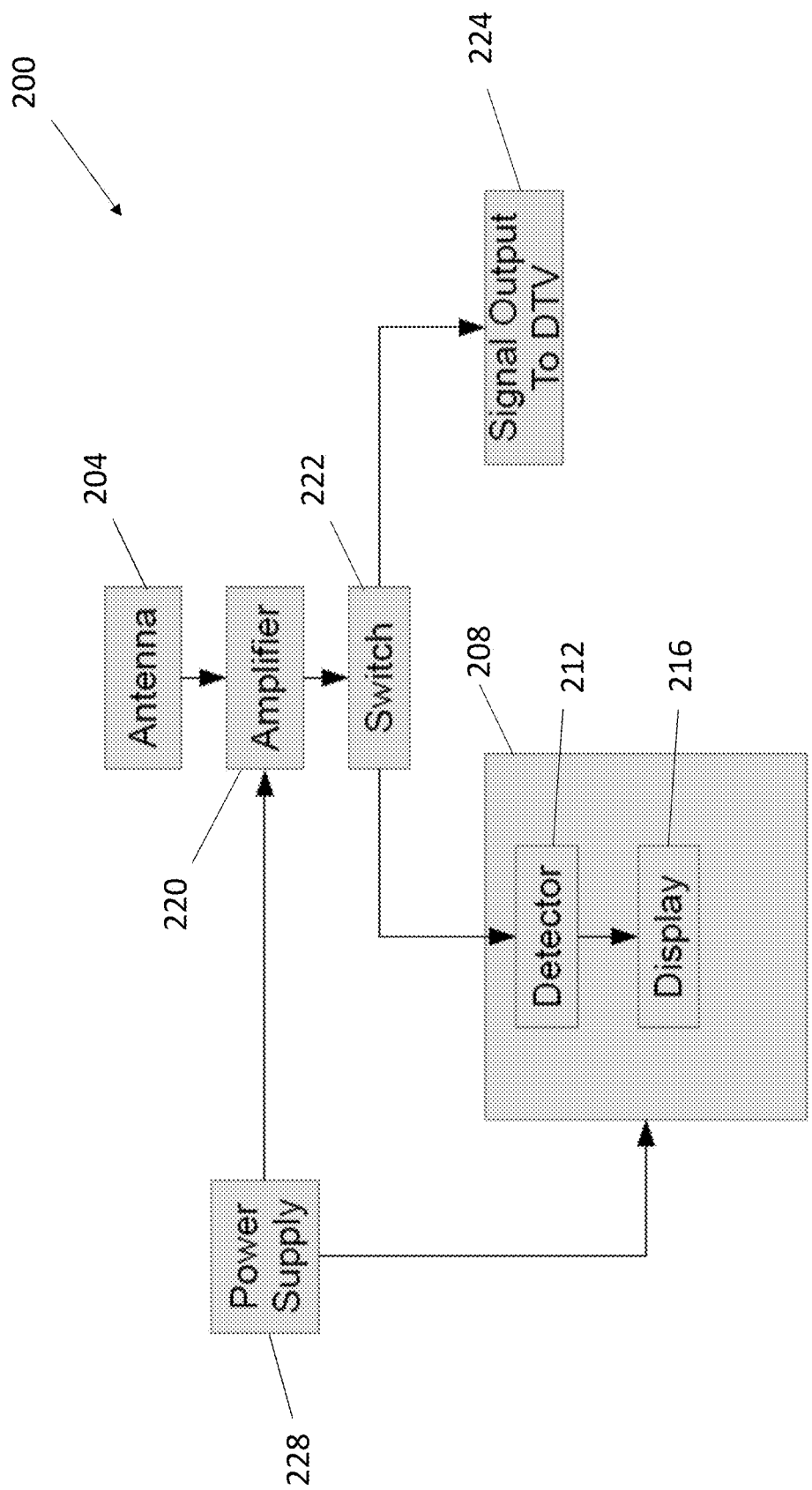
FIG. 2 illustrates an antenna assembly including a signal level indicator (SLI) according to a second exemplary embodiment.

FIG. 2 illustrates an exemplary embodiment of an antenna assembly 200 embodying one or more aspects of the present disclosure. The antenna assembly 200 includes an antenna 204 and a signal level indicator (SLI) 208, which is configured to indicate a strength of signals received by the antenna 204.

The signal level indicator 208 includes a detector 212 and a display 216. Also shown in FIG. 2 are a single output amplifier 220 with a switch 222. A power supply 228 may be configured to provide power for the signal level indicator 208 and the amplifier 220. The amplifier 220 may be configured to be operable for amplifying signals received by the antenna 204 before the amplified signals are transmitted from the amplifier 220 through the switch 222 to the signal level indicator 208 or the signal output 224.

By way of example, the antenna 204 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 200 may be used for receiving digital television signals (of which high definition television (HDTV) signals are a subset) and communicating the received signals to an external device, such as a television. A coaxial cable may be used for transmitting signals received by the antenna assembly 200 to the television.

In this example, the antenna 204 and amplifier 220 may be configured to naturally have low pass and high pass functionality according to geometry. The antenna 204 may be tuned (e.g., shaped, sized, etc.) for DTV bands such that other signals are naturally attenuated. In which case, this exemplary embodiment may not require high pass and low pass filter stages, as the antenna may instead be relied upon as a filter. By allowing for the elimination of the use of a combination of low pass and high pass filters to remove signals not associated with DTV from the SLI signal path, this exemplary embodiment may allow for reduced costs and complexity.

Figure 3:
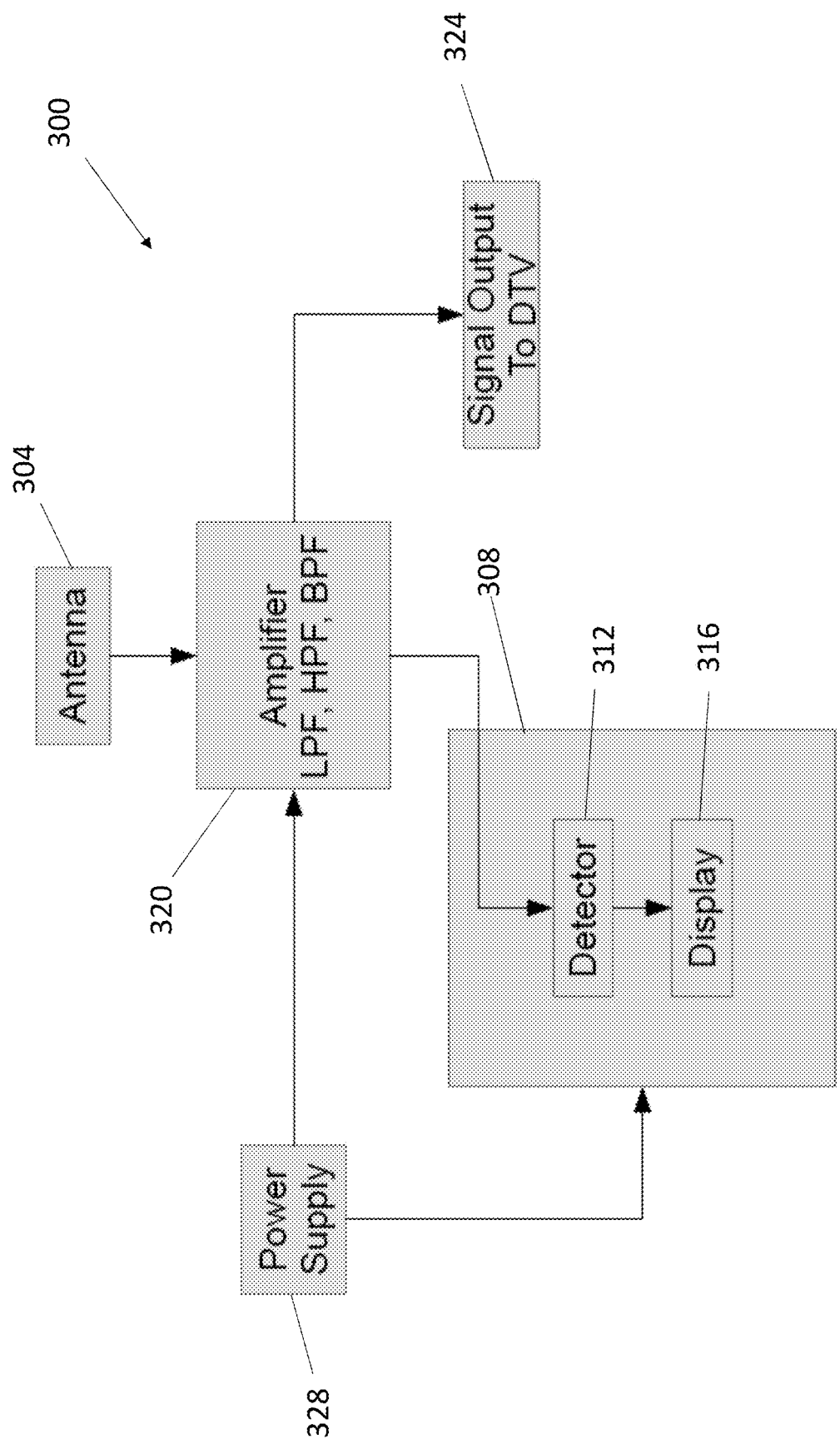
FIG. 3 illustrates an antenna assembly including a signal level indicator (SLI) according to a third exemplary embodiment.

FIG. 3 illustrates an exemplary embodiment of an antenna assembly 300 embodying one or more aspects of the present disclosure. The antenna assembly 300 includes an antenna 304 and a signal level indicator (SLI) 308, which is configured to indicate a strength of signals received by the antenna 304.

The signal level indicator 308 includes a detector 312 and a display 316. Also shown in FIG. 3 are a signal output 324 and an amplifier 320 in which a low pass filter (LPF), high bass filter (HPF), and/or band pass filter (BPF) functionality are integrated with the amplifier stage. A power supply 328 may be configured to provide power for the signal level indicator 308 and the amplifier 320. The amplifier 320 may be configured to be operable for filtering unwanted signals and amplifying signals having frequencies of interest that are received by the antenna 304 before the amplified signals are transmitted from the amplifier 320 to the signal level indicator 308 and the signal output 324. Accordingly, this exemplary embodiment includes filtration integrated into the amplifier stage and cascades to the display unit 316 of the signal level indicator 308.

By way of example, the antenna 304 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 300 may be used for receiving digital television signals (of which high definition television (HDTV) signals are a subset) and communicating the received signals to an external device, such as a television. A coaxial cable may be used for transmitting signals received by the antenna assembly 300 to the television.

Figure 4:
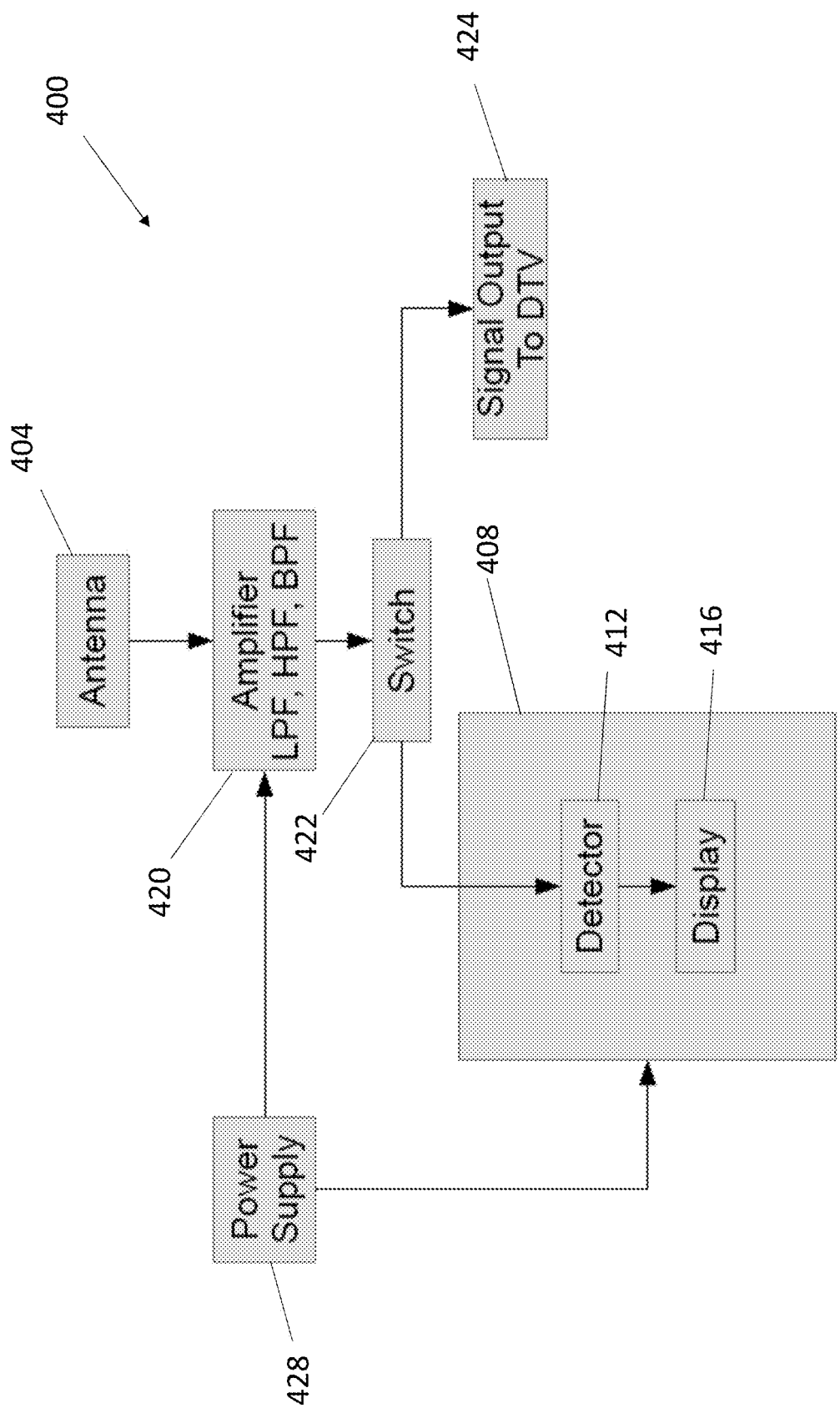
FIG. 4 illustrates an antenna assembly including a signal level indicator (SLI) according to a fourth exemplary embodiment.

FIG. 4 illustrates an exemplary embodiment of an antenna assembly 400 embodying one or more aspects of the present disclosure. The antenna assembly 400 includes an antenna 404 and a signal level indicator (SLI) 408, which is configured to indicate a strength of signals received by the antenna 404.

The signal level indicator 408 includes a detector 412 and a display 416. Also shown in FIG. 4 are an amplifier 420 and a switch 422. Low pass filter (LPF), high bass filter (HPF), and/or band pass filter (BPF) functionality are integrated with the amplifier stage. A power supply 428 may be configured to provide power for the signal level indicator 408 and the amplifier 420. The amplifier 420 may be configured to be operable for filtering unwanted signals and amplifying signals having frequencies of interest that are received by the antenna 404 before the amplified signals are transmitted from the amplifier 420 through the switch 422 to the signal level indicator 408 or the signal output 424.

By way of example, the antenna 404 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 400 may be used for receiving digital television signals (of which high definition television (HDTV) signals are a subset) and communicating the received signals to an external device, such as a television. A coaxial cable may be used for transmitting signals received by the antenna assembly 400 to the television.

Figure 5:
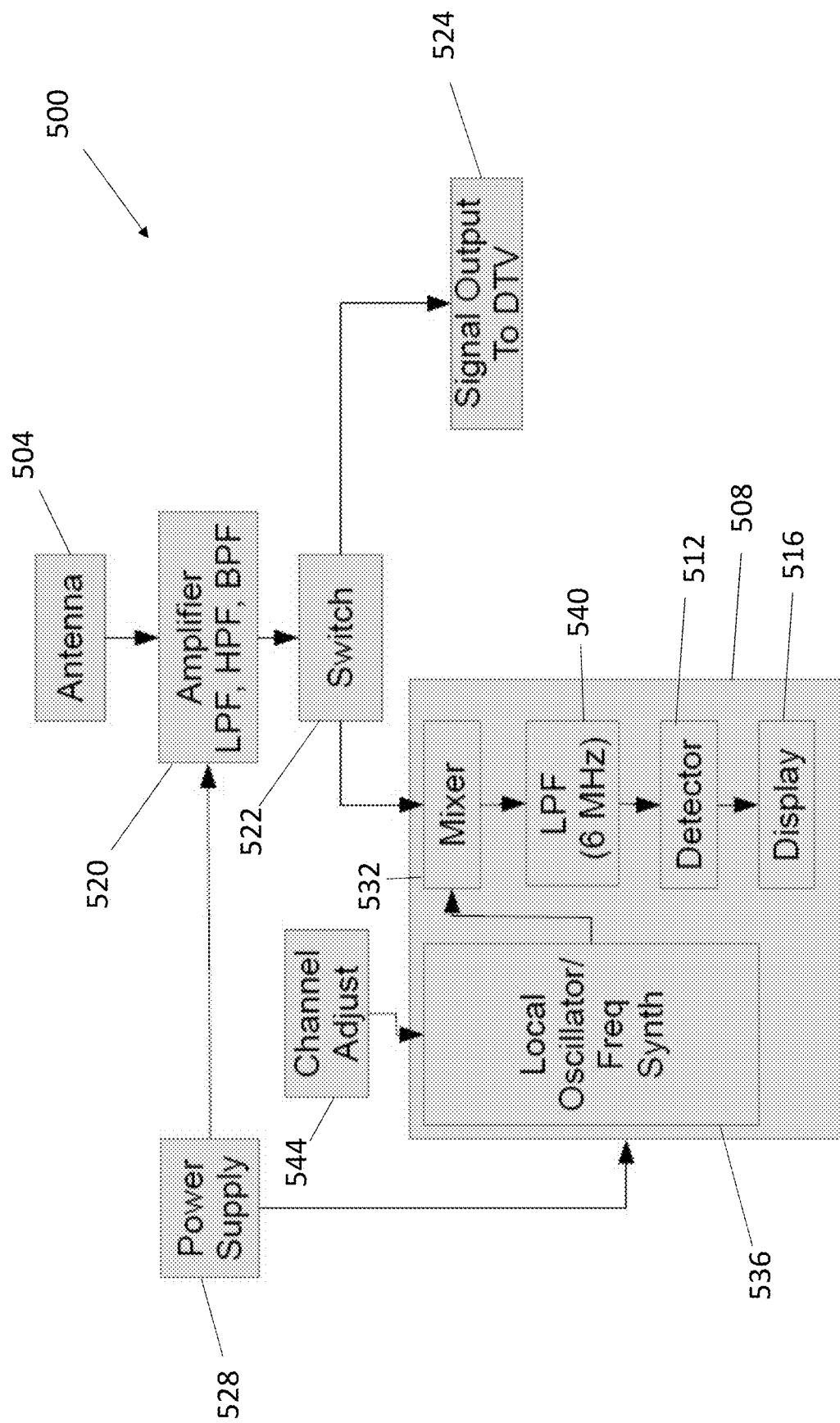
FIG. 5 illustrates an antenna assembly including a signal level indicator (SLI) according to a fifth exemplary embodiment.

FIG. 5 illustrates an exemplary embodiment of an antenna assembly 500 embodying one or more aspects of the present disclosure. The antenna assembly 500 includes an antenna 504 and a signal level indicator (SLI) 508, which is configured to indicate a strength of signals received by the antenna 504.

The signal level indicator 508 includes a detector 512, a display 516, a mixer 532, a local oscillator/frequency synthesizer 536, and a low pass filter 540 (e.g., 6 Megahertz (MHz) low pass filter LPF, etc.). Also shown in FIG. 5 are an amplifier 520, a switch 522, a signal output 524, and a channel adjust 544. A power supply 528 may be configured to provide power for the signal level indicator 508 and the amplifier 520.

With continued reference to FIG. 5, this exemplary embodiment may be configured to use the heterodyne method to efficiently select a single channel from among many as is conventionally done in radio receivers. Output of the variable frequency local oscillator 536 is mixed via mixer 532 with amplified and filtered signals from the amplifier 520 received by the antenna 504 to produce sum and difference frequencies. The difference frequency for a selected channel lands at baseband such that the low pass filter (LPF) 540 with about 6 MHz bandwidth (BW) may be used to remove remaining channels and sum frequencies. The output of the LPF 540 is passed to the detector 512 and then optionally amplified and scaled and sent to display 516 (e.g., LED, meter, etc.). Depending on the configuration of the local oscillator (LO) 536, channel adjust 544 may be a rotary knob with scale to adjust a voltage-controlled oscillator (VCO) or a rotary encoder to send digital channel information to programmable frequency synthesizer. Although the amplifier 520 is shown with integrated LPF, HPF, BPF, the filtration may not be needed or required for SLI in all exemplary embodiments. But the LPF, HPF, and/or BPF functionality may be integrated with or provided to the amplifier 520 to improve reception at DTV in some exemplary embodiments.

Accordingly, the exemplary embodiment shown in FIG. 5 does not necessarily include and/or does not require the use of passive filtration and a simple detector circuit to provide a rough measure of signal quality across one or more portions of the UHF DTV band, and therefore may avoid problems associated thereof. One such example problem is that measurement with this conventional process is reflective of overall signal level in band rather than any particular channel. In which case, the conventional signal level indicator can relatively easily be swamped by a single strong channel that masks weaker signals, such that it is impossible to adjust position and orientation to receive weaker channels with this conventional approach. Also, the conventional approach of using a switched bank of filters to select a single channel tends to be relatively expensive and is not practical for more than a few channels or groups of channels.

By way of example, the antenna 504 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 500 may be used for receiving digital television signals (of which high definition television (HDTV) signals are a subset) and communicating the received signals to an external device, such as a television. A coaxial cable may be used for transmitting signals received by the antenna assembly 500 to the television.

Figure 6:
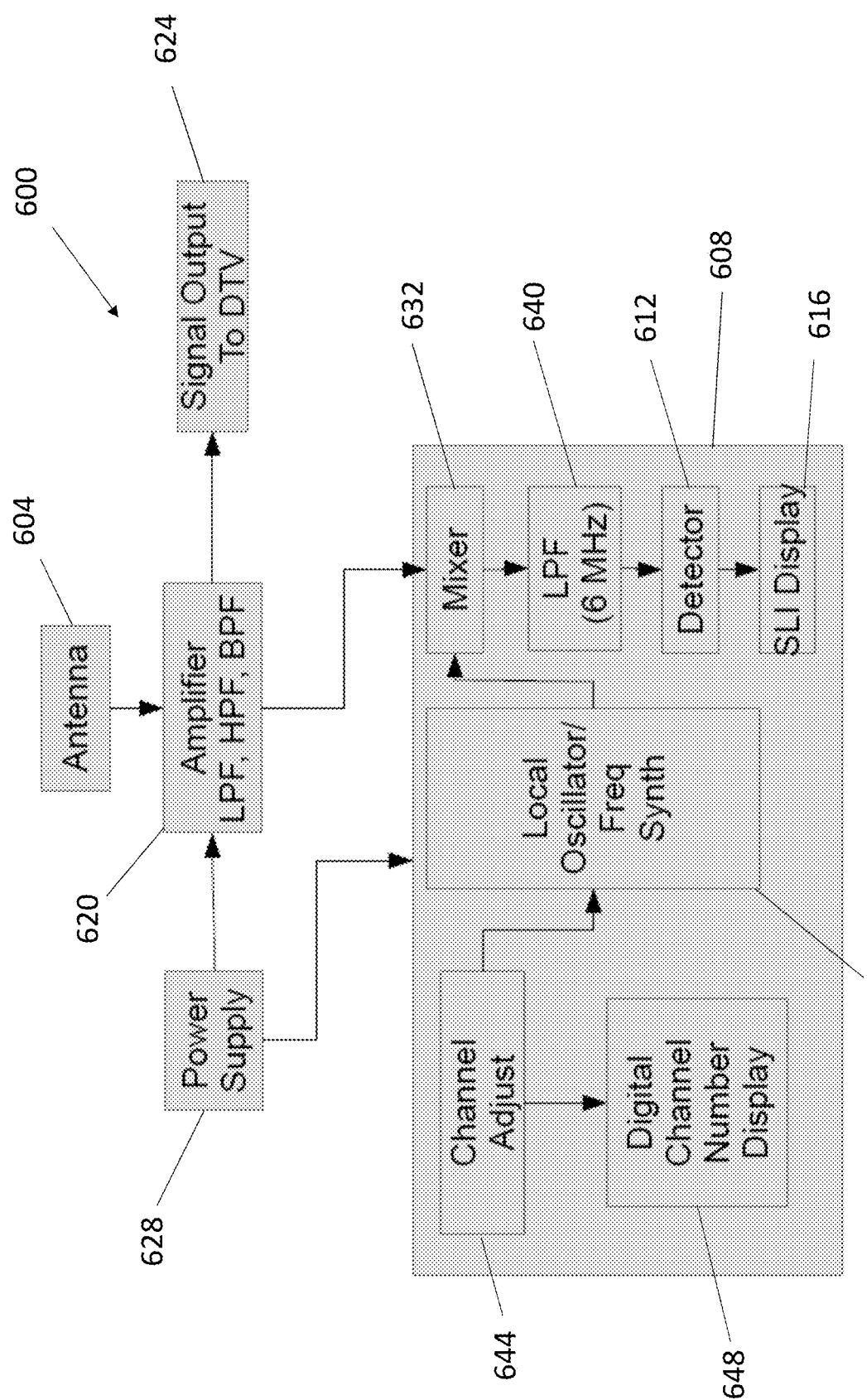
FIG. 6 illustrates an antenna assembly including a signal level indicator (SLI) according to a sixth exemplary embodiment.

FIG. 6 illustrates an exemplary embodiment of an antenna assembly 600 embodying one or more aspects of the present disclosure. The antenna assembly 600 includes an antenna 604 and a signal level indicator (SLI) 608, which is configured to indicate a strength of signals received by the antenna 604.

The signal level indicator 608 includes a detector 612, a display 616, a mixer 632, a local oscillator/frequency synthesizer 636, and a low pass filter 640 (e.g., 6 Megahertz (MHz) low pass filter LPF, etc.). Also shown in FIG. 6 are an amplifier 620, a signal output 624, a channel adjust 644, and a digital channel number display 648. The channel adjust function may be accomplished using capacitive type up/down push buttons or a rotary optical encoder. The selected channel number may be displayed digitally using simple numeric LED/LCD channel number display integrated into the housing of the device. A power supply 628 may be configured to provide power for the signal level indicator 608 and the amplifier 620.

With continued reference to FIG. 6, this exemplary embodiment may be configured to use the heterodyne method to efficiently select a single channel from among many as is conventionally done in radio receivers. Output of the variable frequency local oscillator 636 is mixed via mixer 632 with amplified and filtered signals from the amplifier 620 received by the antenna 604 to produce sum and difference frequencies. The difference frequency for a selected channel lands at baseband such that the low pass filter (LPF) 640 with about 6 MHz bandwidth (BW) may be used to remove remaining channels and sum frequencies. The output of the LPF 640 is passed to the detector 612 and then optionally amplified and scaled and sent to the SLI display 616 (e.g., LED, meter, etc.). Although the amplifier 620 is shown with integrated LPF, HPF, BPF, the filtration may not be needed or required for SLI in all exemplary embodiments. But the LPF, HPF, and/or BPF functionality may be integrated with or provided to the amplifier 620 to improve reception at DTV in some exemplary embodiments.

By way of example, the antenna 604 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 600 may be used for receiving digital television signals (of which high definition television (HDTV) signals are a subset) and communicating the received signals to an external device, such as a television. A coaxial cable may be used for transmitting signals received by the antenna assembly 600 to the television.

Figure 7:
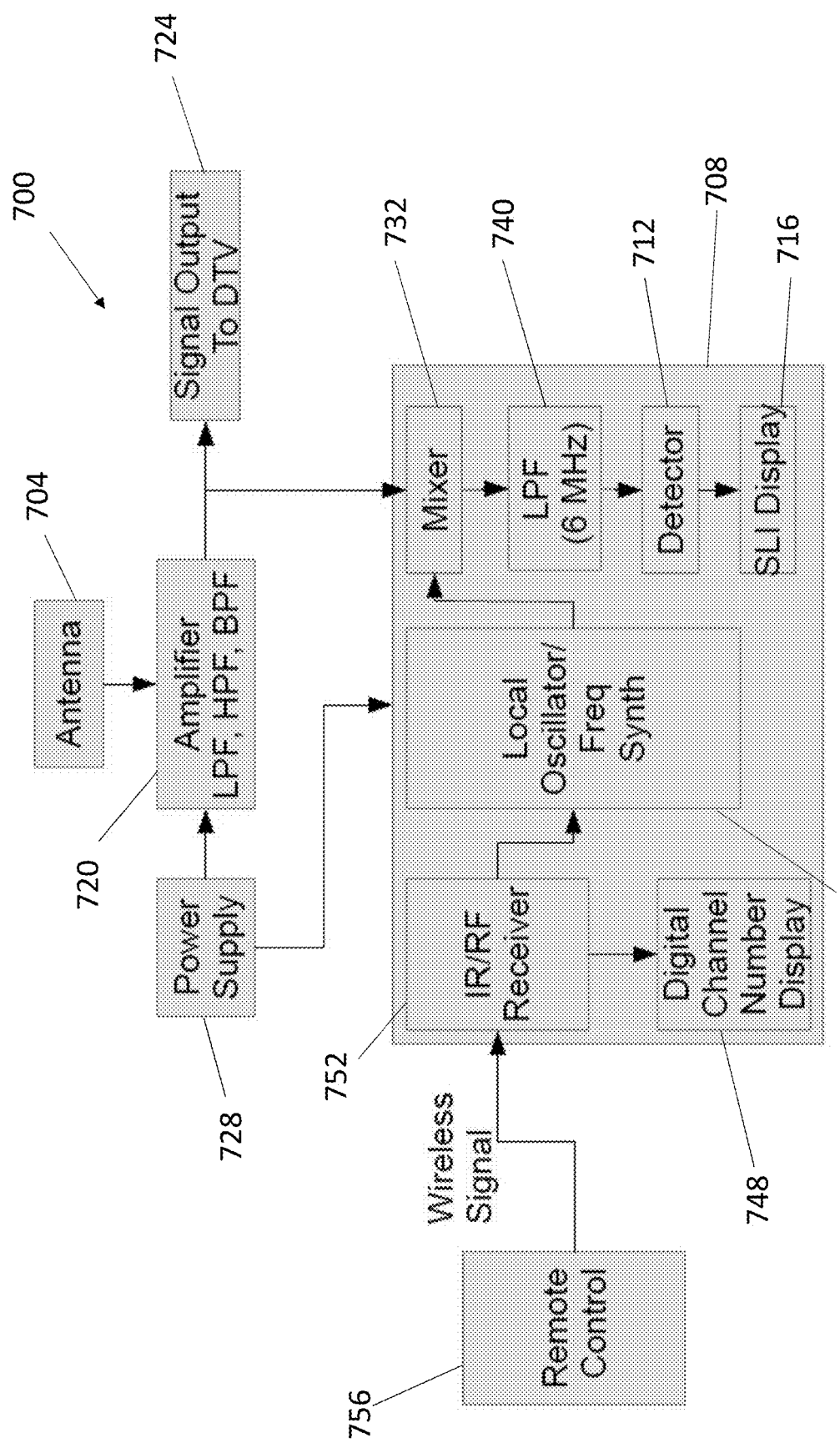
FIG. 7 illustrates an antenna assembly including a signal level indicator (SLI) according to a seventh exemplary embodiment.

FIG. 7 illustrates an exemplary embodiment of an antenna assembly 600 embodying one or more aspects of the present disclosure. The antenna assembly 700 includes an antenna 704 and a signal level indicator (SLI) 708, which is configured to indicate a strength of signals received by the antenna 704.

The signal level indicator 708 includes a detector 712, a display 716, a mixer 732, a local oscillator/frequency synthesizer 736, and a low pass filter 740 (e.g., 6 Megahertz (MHz) low pass filter LPF, etc.). Also shown in FIG. 7 are an amplifier 720, a signal output 724, an infrared/radio frequency (IR/RF) receiver 752, a wireless IR/RF remote control device 756 for channel adjust, and a digital channel number display 748. Accordingly, the channel adjust function may be accomplished in this exemplary embodiment by using the wireless IR/RF remote control device 756 and the associated IR/RF receiver 752, which may be integrated within the antenna housing. The channel selected on the SLI display may be selected remotely using up/down buttons or direct digital channel entry on the remote control 756. The channel selected may be displayed digitally on the antenna unit using a simple numeric LED/LCD channel number display integrated into the housing of the device. A power supply 728 may be configured to provide power for the signal level indicator 708 and the amplifier 720.

With continued reference to FIG. 7, this exemplary embodiment may be configured to use the heterodyne method to efficiently select a single channel from among many as is conventionally done in radio receivers. Output of the variable frequency local oscillator 736 is mixed via mixer 732 with amplified and filtered signals from the amplifier 720 received by the antenna 704 to produce sum and difference frequencies. The difference frequency for a selected channel lands at baseband such that the low pass filter (LPF) 740 with about 6 MHz bandwidth (BW) may be used to remove remaining channels and sum frequencies. The output of the LPF 740 is passed to the detector 712 and then optionally amplified and scaled and sent to the SLI display 716 (e.g., LED, meter, etc.). Although the amplifier 720 is shown with integrated LPF, HPF, BPF, the filtration may not be needed or required for SLI in all exemplary embodiments. But the LPF, HPF, and/or BPF functionality may be integrated with or provided to the amplifier 720 to improve reception at DTV in some exemplary embodiments.

By way of example, the antenna 704 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 700 may be used for receiving digital television signals (of which high definition television (HDTV) signals are a subset) and communicating the received signals to an external device, such as a television. A coaxial cable may be used for transmitting signals received by the antenna assembly 700 to the television.

Figure 8:
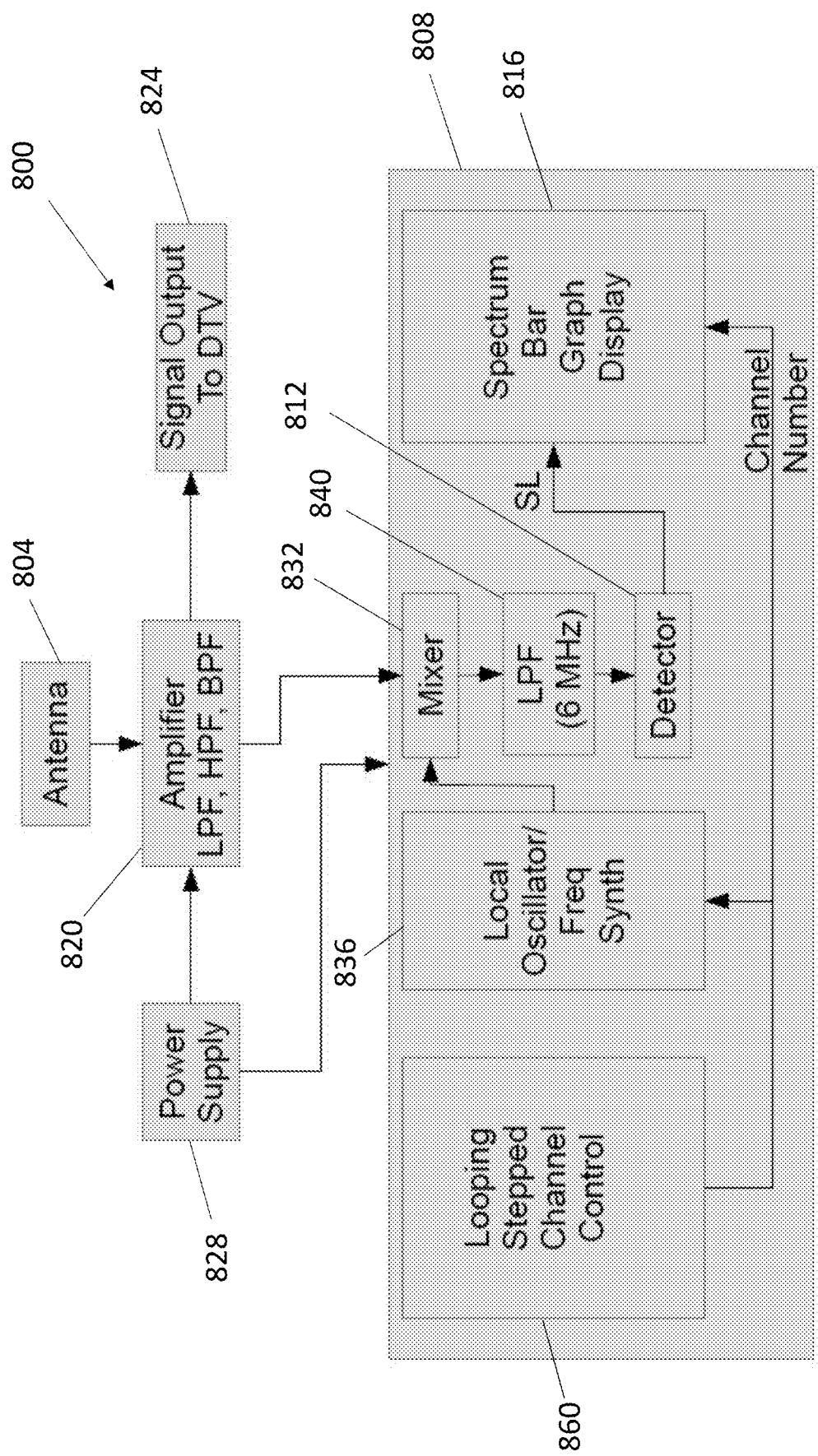
FIG. 8 illustrates an antenna assembly including a signal level indicator (SLI) according to an eighth exemplary embodiment.

FIG. 8 illustrates an exemplary embodiment of an antenna assembly 600 embodying one or more aspects of the present disclosure. The antenna assembly 800 includes an antenna 804 and a signal level indicator (SLI) 808, which is configured to indicate a strength of signals received by the antenna 804.

The signal level indicator 808 includes a detector 812, a display 816, a mixer 832, a local oscillator/frequency synthesizer 836, and a low pass filter 840 (e.g., 6 Megahertz (MHz) low pass filter LPF, etc.). Also shown in FIG. 8 are an amplifier 820, a looping stepped channel control 860, a power supply 828, and a signal output 824.

With continued reference to FIG. 8, this exemplary embodiment may also be configured to use the heterodyne method with a graphical spectrum display 816, which may allow for finding an antenna position and orientation that optimizes reception of more than a single channel. To support channel surfing, the ideal or preferred position and orientation for an antenna is selected such that all available channels are received at adequate levels for viewing at the same time. However, finding such a location and orientation using single channel heterodyne SLI methods may be difficult since each time the antenna is re-positioned or re-oriented the user may then need to step through all channels to ensure that the signal levels are high enough for reception. To simplify finding an optimal position for reception of all available channels, this exemplary embodiment preferably includes the display 816 that is configured to provide a graphical display of the signal level for all available channels or effectively a graphical spectrum display. This may be accomplished by generating a control signal that steps the channel adjust signal digitally through allowable channels (e.g., channels 2 through 51, etc.) in a repetitive loop. Dwell time on each channel would be sufficient to allow the detector 812 to obtain a reading of the signal level. The signal level reading is delivered to the graphical bar graph display 816 along with the output of the detector 812 to create a spectrum bar graph display. A bar graph display may be implemented using an array of multi-segment LED/LCD indicators or using LCD display that has pixel level control features.

By way of example, the antenna 804 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 800 may be used for receiving digital television signals (of which high definition television (HDTV) signals are a subset) and communicating the received signals to an external device, such as a television. A coaxial cable may be used for transmitting signals received by the antenna assembly 800 to the television.

Figure 9:
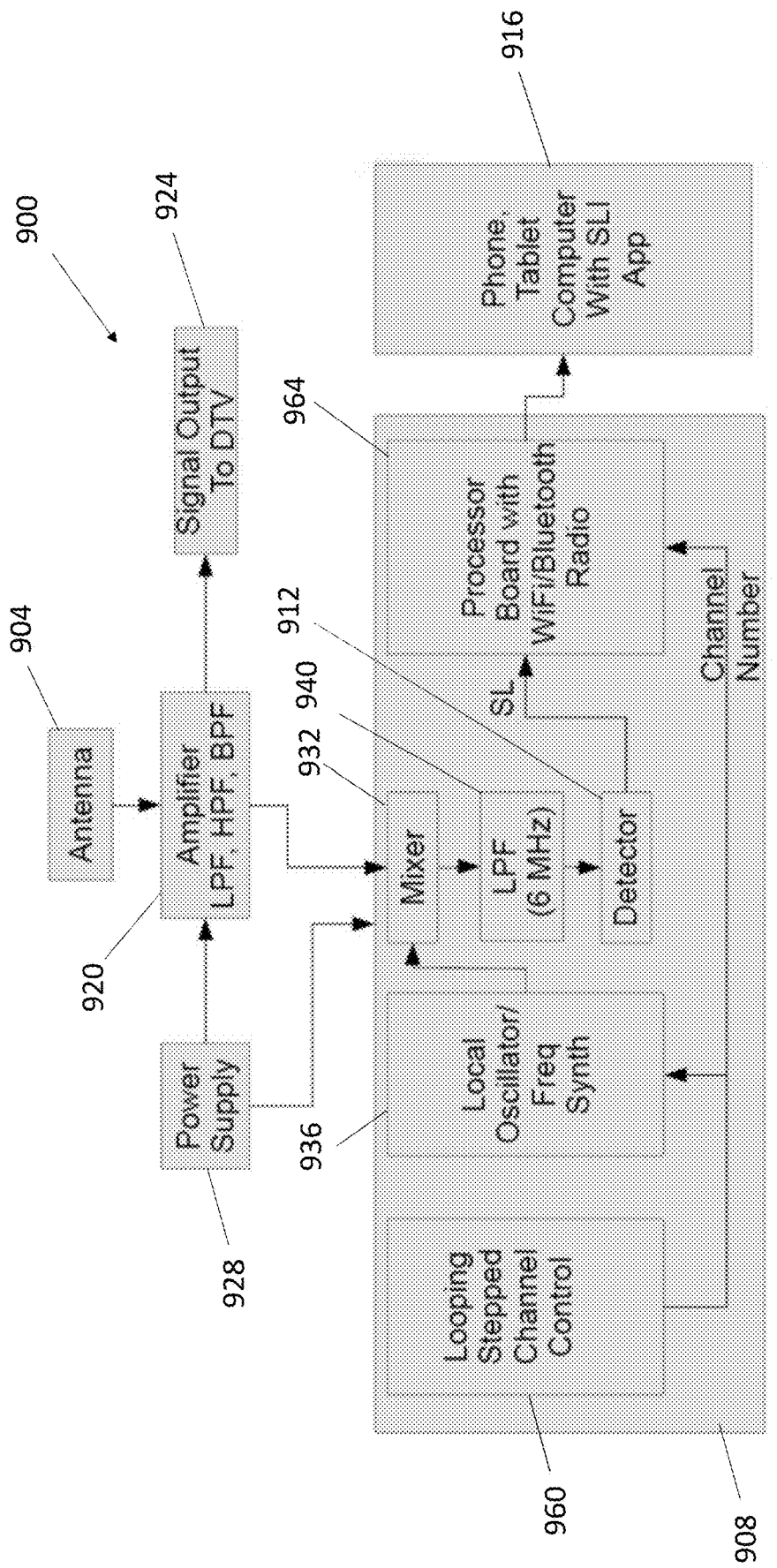
FIG. 9 illustrates an antenna assembly including a signal level indicator (SLI) according to a ninth exemplary embodiment.

FIG. 9 illustrates an exemplary embodiment of an antenna assembly 900 embodying one or more aspects of the present disclosure. The antenna assembly 900 includes an antenna 904 and a signal level indicator (SLI) 908, which is configured to indicate a strength of signals received by the antenna 904.

The signal level indicator 908 includes a detector 912, a display 916, a mixer 932, a local oscillator/frequency synthesizer 936, and a low pass filter 940 (e.g., 6 Megahertz (MHz) low pass filter LPF, etc.), and a processor 964. Also shown in FIG. 9 are an amplifier 920, a looping stepped channel control 960, a power supply 928, and a signal output 924.

With continued reference to FIG. 9, this exemplary embodiment may be configured to use the heterodyne method with a graphical spectrum display, which may allow for finding an antenna position and orientation that optimizes reception of more than a single channel. In this example, the graphical spectrum display may comprise a display 916 of a computer, smartphone, tablet, other electronic device. As recognized by the inventor hereof, it may be less costly and/or more effective to enable the display of the spectrum graph on such a portable electronic device than to integrate a graphical display into the antenna housing. The microprocessor 964 may comprise a microprocessor board with a WiFi or Bluetooth network interface that is integrated into the antenna housing. The data corresponding to the channel number and signal level may be streamed to the user's smartphone, computer, tablet, other device, etc. To enable the display, the user pairs the user's smartphone, computer, tablet, etc. to the network device contained in the antenna housing. The user loads an app which receives streamed SLI data and displays it in graphical form on the user's smartphone, computer, tablet, etc. Because the signal level display is under software control, the signal level display can be configured to display a single channel at a time, all available channels, or perhaps a user configured subset of channels as desired.

By way of example, the antenna 904 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 900 may be used for receiving digital television signals (of which high definition television (HDTV) signals are a subset) and communicating the received signals to an external device, such as a television. A coaxial cable may be used for transmitting signals received by the antenna assembly 900 to the television.

Figure 10:
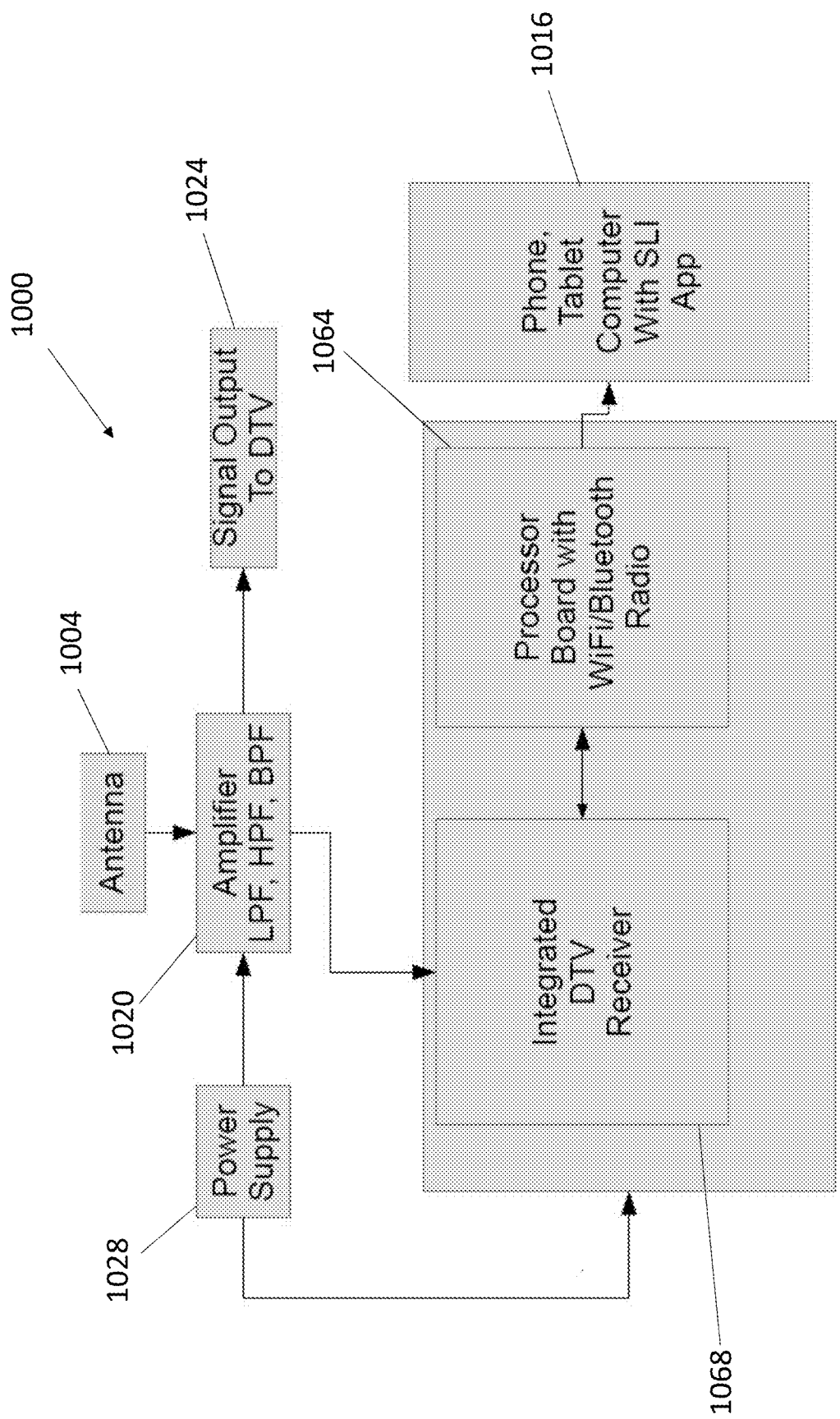
FIG. 10 illustrates an antenna assembly including a signal level indicator (SLI) according to a tenth exemplary embodiment.

FIG. 10 illustrates an exemplary embodiment of an antenna assembly 600 embodying one or more aspects of the present disclosure. The antenna assembly 1000 includes an antenna 1004 and an integrated DTV receiver 1068, which may be configured to obtain detailed signal level and signal quality metrics.

Also shown in FIG. 10 are an amplifier 1020, a power supply 1028, a signal output 1024, a display 1016 of a computer, smartphone, tablet, other electronic device with SLI app, and a microprocessor 1064. The microprocessor 1064 may comprise a microprocessor board with a WiFi or Bluetooth network interface that is integrated into the antenna housing. Although the amplifier 1020 is shown with integrated LPF, HPF, BPF, the filtration may not be needed or required in all exemplary embodiments. But the LPF, HPF, and/or BPF functionality may be integrated with or provided to the amplifier 1020 to improve reception at DTV in some exemplary embodiments.

DTV signals can have high strength yet still be of poor quality due to noise, interference, and multi-path signals. DTV signals with poor quality often result in audio channel and display corruption as well as freezes and drop outs. This exemplary embodiment may include a complete DTV receiver within the antenna housing. The integrated DTV receiver 1068 may be used to obtain detailed signal level and signal quality metrics that are not provided by simpler SLI only devices. The antenna assembly 1000 may also include the processor board 1064 along with WiFi and/or Bluetooth interfaces to allow the detailed signal quality information to be displayed in various forms, e.g., on computers, smartphones, tablets, other electronic devices. Because the signal level display is under software control, the signal level display can be configured to display a single channel at a time, all available channels, or perhaps a user configured subset of channels as desired.

In some exemplary embodiments, the actual broadcast signals received on the DTV receiver may be routed over WiFi to a user's phone, tablet, computer, etc., thereby enabling the antenna to provide signals to a DTV display via a wireless as well as the standard wired connection.

By way of example, the antenna 1004 may include a VHF antenna element and a UHF antenna element. The VHF antenna element may be configured to be operable for receiving VHF high definition television signals, e.g., from about 174 megahertz to about 216 megahertz, etc. The UHF antenna element may be configured for receiving UHF high definition television signals, e.g., from about 470 megahertz to about 698 megahertz, etc. The antenna assembly 1000 may be used for receiving digital television signals (of which high definition television (HDTV) signals are a subset) and communicating the received signals to an external device, such as a television. A coaxial cable may be used for transmitting signals received by the antenna assembly 1000 to the television.

In exemplary embodiments, an antenna assembly includes an antenna configured to be operable for receiving signals, a signal level indicator for indicating a strength of signals received by the antenna, and an amplifier coupled for communication with the antenna, the signal level indicator, and a signal output. The amplifier is configured to be operable for amplifying signals received by the antenna.

In exemplary embodiments, the amplifier is coupled for communication with the antenna, the signal level indicator, and the signal output such that amplified signals from the amplifier are communicated to the signal level indicator and the signal output without high pass filtration and without low pass filtration.

In exemplary embodiments, the antenna is shaped and sized such that the antenna is tuned for digital television bands whereby signals outside the digital television bands are naturally attenuated by the antenna without requiring high pass and low pass filter stages.

In exemplary embodiments, the antenna assembly may comprise a switch coupled for communication with the amplifier, the signal level indicator, and the signal output. Amplified signals from the amplifier may be transmitted through the switch to the signal level indicator or the signal output.

In exemplary embodiments, the signal level indicator comprises a detector configured for communication with a display that is operable for displaying a corresponding signal strength indication according to the strength of the signals received by the antenna. The detector may comprise a diode or rectifier circuit, etc. By way of example, the display may comprise one or more light emitting diodes and/or one or more liquid crystal displays. Or, for example, the display may comprise a display of an external electronic device configured for communication with the signal level indicator. As yet another example, the signal level indicator may integrally include the display.

In exemplary embodiments, the signal level indicator comprises: a variable frequency local oscillator; a mixer coupled for communication with the variable frequency local oscillator and the amplifier; and a low pass filter coupled for communication with the mixer and the detector. The mixer may be operable for mixing an output of the variable frequency local oscillator with signals received by the antenna and amplified by the amplifier to thereby produce sum and difference frequencies. A difference frequency for a selected channel lands at baseband. The low pass filter is operable for removing remaining channels and sum frequencies. The antenna assembly is configured to be operable for using a heterodyne to select a single available channel from among a plurality of available channels.

In exemplary embodiments, the detector comprises a diode or rectifier circuit. And, the signal level indicator is configured such that an output of the low pass filter is passed to the diode or rectifier detector and scaled and/or amplified for the display. In such exemplary embodiments, a half or full wave signal passed through the low pass filter and then scaled, including possibly with amplification, as necessary to drive the display properly.

In exemplary embodiments, the antenna assembly includes a channel adjust coupled for communication with the variable frequency local oscillator. The variable frequency local oscillator comprises a voltage-controlled oscillator. The channel adjust comprises a rotary knob configured to be operable for adjusting the voltage-controlled oscillator.

In exemplary embodiments, the antenna assembly includes a channel adjust coupled for communication with the variable frequency local oscillator. The variable frequency local oscillator comprises a programmable frequency synthesizer. The channel adjust comprises a rotary encoder configured to be operable for communicating digital channel information to the programmable frequency synthesizer.

In exemplary embodiments, the signal level indicator includes a channel adjust coupled for communication with the variable frequency local oscillator. The channel adjust comprises capacitive type up/down push buttons or a rotary optical encoder. The signal level indicator also includes a digital channel number display configured to be operable for digitally displaying a numeric channel number selected via the channel adjust.

In exemplary embodiments, the signal level indicator includes an infrared/radio frequency receiver coupled for communication with the variable frequency local oscillator. The infrared/radio frequency receiver is configured for communication with an infrared/radio frequency remote control. The signal level indicator also includes a digital channel number display configured to be operable for digitally displaying a numeric channel number selected via the infrared/radio frequency remote control.

In exemplary embodiments, the signal level indicator includes a looping stepped channel control coupled for communication with the variable frequency local oscillator. The antenna assembly is configured to be operable for generating a control signal that steps a channel adjust signal digitally through allowable channels in a repetitive loop with a dwell time on each channel sufficient to allow the detector to obtain a reading of the signal level. The signal level reading is deliverable to the display along with output of the detector for displaying a spectrum bar graph of signal level for all available channels. The spectrum bar graph is usable for finding an antenna position and orientation that optimizes reception of more than a single available channel.

In exemplary embodiments, the signal level indicator integrally includes the display configured to be operable for displaying the spectrum bar graph of signal level for all available channels. In other exemplary embodiments, the signal level indicator includes a processor coupled for communication with the detector and the looping stepped channel control. The processor is configured for communication with an external electronic device having a display that is operable for displaying the spectrum bar graph of signal level for all available channels.

In exemplary embodiments, the signal level indicator comprises an integrated digital television receiver configured to be operable for obtaining detailed signal level and signal quality metrics of the signals received by the antenna. The signal level indicator comprises a processor coupled for communication with the integrated digital television receiver. The processor is configured for communication with an external electronic device having a display that is operable for displaying the detailed signal level and signal quality metrics obtained by the integrated digital television receiver.

In exemplary embodiments, the antenna comprises a VHF antenna element configured to be operable for receiving VHF high definition television signals (e.g., from about 174 megahertz to about 216 megahertz, etc.), and a UHF antenna element configured to be operable for receiving UHF high definition television signals (e.g., from about 470 megahertz to about 698 megahertz, etc.). The signal level indicator is configured to be operable for indicating strength of the VHF high definition television signals received by the VHF antenna element and for indicating strength of the UHF high definition television signals received by the UHF antenna element. The antenna assembly is configured for transmitting the VHF and UHF high definition television signals respectively received by the VHF and UHF antenna elements to an external device via the signal output.

In exemplary embodiments, the antenna is configured to be operable for receiving digital television signals. The signal level indicator is configured to be operable for indicating strength of the digital television signals received by the antenna.

In exemplary embodiments, the antenna is configured to be operable for receiving high definition television signals. The signal level indicator is configured to be operable for indicating strength of the high definition television signals received by the antenna.

Exemplary embodiments include a signal level indicator for indicating a strength of signals received by an antenna. The signal level indicator comprises a printed circuit board, a detector on or along (e.g., mounted to, etc.) the printed circuit board, and a display on or along (e.g., mounted to, etc.) the printed circuit board. The display is configured to be operable for displaying a corresponding signal strength indication according to the strength of the signals received by the antenna.

In exemplary embodiments, the signal level indicator comprises a variable frequency local oscillator on or along (e.g., mounted to, etc.) the printed circuit board. A mixer is on or along (e.g., mounted to, etc.) the printed circuit board. The mixer is coupled for communication with the variable frequency local oscillator. A low pass filter is on or along (e.g., mounted to, etc.) the printed circuit board. The low pass filter is coupled for communication with the mixer and the detector.

In exemplary embodiments, the mixer is operable for mixing an output of the variable frequency local oscillator with signals received by the antenna to thereby produce sum and difference frequencies. A difference frequency for a selected channel lands at baseband. The low pass filter is operable for removing remaining channels and sum frequencies.

In exemplary embodiments, the detector comprises a diode or rectifier circuit. And, the signal level indicator is configured such that an output of the low pass filter is passed to the diode or rectifier detector and scaled and/or amplified for the display. In such exemplary embodiments, a half or full wave signal passed through the low pass filter and then scaled, including possibly with amplification, as necessary to drive the display properly.

In exemplary embodiments, the signal level indicator comprises a channel adjust coupled for communication with the variable frequency local oscillator. A digital channel number display is configured to be operable for digitally displaying a numeric channel number selected via the channel adjust.

In exemplary embodiments, the signal level indicator comprises an infrared/radio frequency receiver coupled for communication with the variable frequency local oscillator. The infrared/radio frequency receiver is configured for communication with an infrared/radio frequency remote control. A digital channel number display is configured to be operable for digitally displaying a numeric channel number selected via the infrared/radio frequency remote control.

In exemplary embodiments, the signal level indicator comprises a looping stepped channel control coupled for communication with the variable frequency local oscillator. A processor is coupled for communication with the detector and the looping stepped channel control. The processor is configured for communication with an external electronic device having a display. The signal level indicator is configured to be operable for generating a control signal that steps a channel adjust signal digitally through allowable channels in a repetitive loop with a dwell time on each channel sufficient to allow the detector to obtain a reading of the signal level. The signal level reading is deliverable to the external electronic device along with output of the detector for displaying a spectrum bar graph of signal level for all available channels. The spectrum bar graph is usable for finding an antenna position and orientation that optimizes reception of more than a single available channel.

In exemplary embodiments, the signal level indicator comprises an integrated digital television receiver configured to be operable for obtaining detailed signal level and signal quality metrics of the signals received by the antenna. A processor is coupled for communication with the integrated digital television receiver. The processor is configured for communication with an external electronic device having a display that is operable for displaying the detailed signal level and signal quality metrics obtained by the integrated digital television receiver.

In exemplary embodiments, the display comprises one or more light emitting diodes and/or one more liquid crystal displays.

Exemplary embodiments include a signal level indicator for indicating a strength of signals received by an antenna. The signal level indicator comprises a detector configured for communication with a display that is operable for displaying a corresponding signal strength indication according to the strength of the signals received by the antenna. The signal level indicator comprises a variable frequency local oscillator, a mixer coupled for communication with the variable frequency local oscillator, and a low pass filter coupled for communication with the mixer and the detector.

In exemplary embodiments, the mixer is operable for mixing an output of the variable frequency local oscillator with signals received by the antenna to thereby produce sum and difference frequencies. A difference frequency for a selected channel lands at baseband. The low pass filter is operable for removing remaining channels and sum frequencies.

In exemplary embodiments, the detector comprises a diode or rectifier circuit. And, the signal level indicator is configured such that an output of the low pass filter is passed to the diode or rectifier detector and scaled and/or amplified for the display. In such exemplary embodiments, a half or full wave signal passed through the low pass filter and then scaled, including possibly with amplification, as necessary to drive the display properly.

In exemplary embodiments, the signal level indicator comprises a channel adjust coupled for communication with the variable frequency local oscillator. A digital channel number display is configured to be operable for digitally displaying a numeric channel number selected via the channel adjust.

In exemplary embodiments, the signal level indicator comprises an infrared/radio frequency receiver coupled for communication with the variable frequency local oscillator. The infrared/radio frequency receiver is configured for communication with an infrared/radio frequency remote control. A digital channel number display is configured to be operable for digitally displaying a numeric channel number selected via the infrared/radio frequency remote control.

In exemplary embodiments, the signal level indicator comprises a looping stepped channel control coupled for communication with the variable frequency local oscillator. A processor is coupled for communication with the detector and the looping stepped channel control. The processor is configured for communication with an external electronic device having a display. The signal level indicator is configured to be operable for generating a control signal that steps a channel adjust signal digitally through allowable channels in a repetitive loop with a dwell time on each channel sufficient to allow the detector to obtain a reading of the signal level. The signal level reading is deliverable to the external electronic device along with output of the detector for displaying a spectrum bar graph of signal level for all available channels. The spectrum bar graph is usable for finding an antenna position and orientation that optimizes reception of more than a single available channel.

In exemplary embodiments, the signal level indicator comprises an integrated digital television receiver configured to be operable for obtaining detailed signal level and signal quality metrics of the signals received by the antenna. A processor is coupled for communication with the integrated digital television receiver. The processor is configured for communication with an external electronic device having a display that is operable for displaying the detailed signal level and signal quality metrics obtained by the integrated digital television receiver.

In exemplary embodiments, the display comprises one or more light emitting diodes and/or one more liquid crystal displays.

In exemplary embodiments, the antenna and/or the amplifier may be configured with a geometry that naturally provides low pass functionality and high pass functionality. For example, the antenna may exhibit some form of a basic band pass filter characteristic. The antenna may also exhibit multiple passbands. The passbands may be centered on or near integer multiples of the fundamental (lowest frequency) resonance of the antenna. Multiple passbands at non-integer multiples may be achieved by means of multiple elements of varying length connected to a common feed point. The passband characteristic of the antenna is generally a function of angle relative to some coordinate system defined about the antenna. The antenna may therefore exhibit different passbands depending on the relative direction of the radiation from a transmit antenna or the relative direction of the incident wave for a receive antenna. A consideration for antenna design is passband associated with angles within the primary or main beam of the antenna. The main beam of the antenna is associated with the angular region containing the maximum gain of the antenna at a particular frequency. In effect, an antenna may be considered a filter with transfer function dependencies in both frequency and angle.

Regarding amplifiers and filters, a high pass filter cascaded with a low pass filter can produce a band pass filter if the cut frequency for the high pass filter is less than the cut frequency for the low pass filter. Amplifiers may exhibit a finite gain-bandwidth product and hence have a natural low pass characteristic at some basic level, which is determined by the open loop gain block characteristics. Further, amplifiers used in RF applications may be AC (capacitively coupled), and AC coupled amplifiers do not pass DC signals. Such amplifiers thus exhibit a natural high pass characteristic at some basic level. Taken together, functional amplifiers whether AC or DC coupled exhibit a minimum of at least one pass band between some lower frequency (possibly DC or 0 Hz) and some upper frequency. The pass band of an amplifier is generally dependent on circuit topology and circuit element characteristics. The use of distributed circuit elements notwithstanding, the passband of an amplifier is not generally a strong function of geometry as is typically the case for antennas.

Exemplary embodiments of antenna assemblies have been disclosed herein as being used for reception of digital television (DTV) signals, such as high definition television (HDTV) signals. Alternative embodiments, however, may include one or more antenna elements tuned for receiving non-television signals and/or signals having frequencies not associated with HDTV. Thus, embodiments of the present disclosure should not be limited to receiving only television signals having a frequency or within a frequency range associated with digital television or HDTV.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 3-9, or 3-8, it is also envisioned that Parameter X may have other ranges of values including 1-9, 1-8, 1-3, 1-3, 3-10, 3-8, 3-3, 3-10, and 3-9.

The terminology used herein is for the purpose of describing particular example embodiments only and is not intended to be limiting. For example, when permissive phrases, such as "may comprise", "may include", and the like, are used herein, at least one antenna assembly comprises or includes the feature(s) in at least one exemplary embodiment. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, antenna elements, and/or components, but do not preclude the presence or addition of one or more other features, integers, steps, operations, antenna elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an antenna element or layer is referred to as being "on", "engaged to", "connected to" or "coupled to" another antenna element or layer, it may be directly on, engaged, connected or coupled to the other antenna element or layer, or intervening antenna elements or layers may be present. In contrast, when an antenna element is referred to as being "directly on," "directly engaged to", "directly connected to" or "directly coupled to" another antenna element or layer, there may be no intervening antenna elements or layers present. Other words used to describe the relationship between antenna elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various antenna elements, components, regions, layers and/or sections, these antenna elements, components, regions, layers and/or sections should not be limited by these terms. These terms may be only used to distinguish one antenna element, component, region, layer or section from another region, layer or section. Terms such as "first," "second," and other numerical terms when used herein do not imply a sequence or order unless clearly indicated by the context. Thus, a first antenna element, component, region, layer or section could be termed a second antenna element, component, region, layer or section without departing from the teachings of the example embodiments.

Spatially relative terms, such as "inner," "outer," "beneath", "below", "lower", "above", "upper" and the like, may be used herein for ease of description to describe one antenna element or feature's relationship to another antenna element(s) or feature(s) as illustrated in the figures. Spatially relative terms may be intended to encompass different orientations of the device in use or operation in addition to the orientation depicted in the figures. For example, if the device in the figures is turned over, antenna elements described as "below" or "beneath" other antenna elements or features would then be oriented "above" the other antenna elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual antenna elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An antenna assembly comprising:
an antenna configured to be operable for receiving signals;
a signal level indicator for indicating a strength of signals received by the antenna;
an amplifier coupled for communication with the antenna, the signal level indicator, and a signal output, the amplifier configured to be operable for amplifying signals received by the antenna; and
a switch coupled for communication with the amplifier, the signal level indicator, and the signal output, whereby amplified signals from the amplifier are transmitted through the switch to the signal level indicator or the signal output.

2. The antenna assembly of claim 1, wherein the amplifier is coupled for communication with the antenna, the signal level indicator, and the signal output such that amplified signals from the amplifier are communicated to the signal level indicator and the signal output without high pass filtration and without low pass filtration.

3. The antenna assembly of claim 1, wherein the antenna is shaped and sized such that that the antenna is tuned for digital television bands whereby signals outside the digital television bands are naturally attenuated by the antenna without requiring high pass and low pass filter stages.

4. The antenna assembly of claim 1, wherein the signal level indicator comprises a detector configured for communication with a display that is operable for displaying a corresponding signal strength indication according to the strength of the signals received by the antenna.

5. The antenna assembly of claim 4, wherein the detector comprises a diode or rectifier circuit.

6. The antenna assembly of claim 4, wherein the display comprises one or more light emitting diodes and/or one or more liquid crystal displays.

7. The antenna assembly of claim 4, wherein the display comprises a display of an external electronic device configured for communication with the signal level indicator, or the signal level indicator integrally includes the display.

8. The antenna assembly of claim 4, wherein the signal level indicator further comprises:
a variable frequency local oscillator;
a mixer coupled for communication with the variable frequency local oscillator and the amplifier; and
a low pass filter coupled for communication with the mixer and the detector.

9. The antenna assembly of claim 1, wherein the signal level indicator comprises:
an integrated digital television receiver configured to be operable for obtaining detailed signal level and signal quality metrics of the signals received by the antenna; and
a processor coupled for communication with the integrated digital television receiver, the processor configured for communication with an external electronic device having a display that is operable for displaying the detailed signal level and signal quality metrics obtained by the integrated digital television receiver.

10. The antenna assembly of claim 1, wherein:
the antenna comprises:
a Very High Frequency (VHF) antenna element configured to be operable for receiving VHF high definition television signals; and
an Ultra High Frequency (UHF) antenna element configured to be operable for receiving UHF high definition television signals;
the signal level indicator is configured to be operable for indicating strength of the VHF high definition television signals received by the VHF antenna element and for indicating strength of the UHF high definition television signals received by the UHF antenna element; and
the antenna assembly is configured for transmitting the VHF and UHF high definition television signals respectively received by the VHF and UHF antenna elements to an external device via the signal output.

11. The antenna assembly of claim 1, wherein:
the antenna is configured to be operable for receiving digital television signals, and the signal level indicator is configured to be operable for indicating strength of the digital television signals received by the antenna; or
the antenna is configured to be operable for receiving high definition television signals, and the signal level indicator is configured to be operable for indicating strength of the high definition television signals received by the antenna.

12. An antenna assembly comprising:
an antenna configured to be operable for receiving signals;
a signal level indicator for indicating a strength of signals received by the antenna;
an amplifier coupled for communication with the antenna, the signal level indicator, and a signal output, the amplifier configured to be operable for amplifying signals received by the antenna;
wherein the signal level indicator comprises:
a detector configured for communication with a display that is operable for displaying a corresponding signal strength indication according to the strength of the signals received by the antenna;
a variable frequency local oscillator;
a mixer coupled for communication with the variable frequency local oscillator and the amplifier; and
a low pass filter coupled for communication with the mixer and the detector;
wherein the mixer is operable for mixing an output of the variable frequency local oscillator with signals received by the antenna and amplified by the amplifier to thereby produce sum and difference frequencies, whereby a difference frequency for a selected channel lands at baseband, the low pass filter is operable for removing remaining channels and sum frequencies, and whereby the antenna assembly is configured to be operable for using a heterodyne to select a single available channel from among a plurality of available channels.

13. An antenna assembly comprising:
an antenna configured to be operable for receiving signals;
a signal level indicator for indicating a strength of signals received by the antenna;
an amplifier coupled for communication with the antenna, the signal level indicator, and a signal output, the amplifier configured to be operable for amplifying signals received by the antenna;
wherein the signal level indicator comprises:
a detector configured for communication with a display that is operable for displaying a corresponding signal strength indication according to the strength of the signals received by the antenna;
a variable frequency local oscillator;

a mixer coupled for communication with the variable frequency local oscillator and the amplifier; and
a low pass filter coupled for communication with the mixer and the detector;

wherein:
the detector comprises a diode or rectifier circuit; and
the signal level indicator is configured such that an output of the low pass filter is passed to the diode or rectifier detector and scaled for the display.

14. The antenna assembly of claim 13, further comprising a switch coupled for communication with the amplifier, the signal level indicator, and the signal output, whereby amplified signals from the amplifier are transmitted through the switch to the signal level indicator or the signal output.

15. The antenna assembly of claim 13, wherein the signal level indicator is configured such that the output of the low pass filter is passed to the diode or rectifier circuit and amplified and scaled for the display.

16. An antenna assembly comprising:
an antenna configured to be operable for receiving signals;
a signal level indicator for indicating a strength of signals received by the antenna;
an amplifier coupled for communication with the antenna, the signal level indicator, and a signal output, the amplifier configured to be operable for amplifying signals received by the antenna;

wherein the signal level indicator comprises:
a detector configured for communication with a display that is operable for displaying a corresponding signal strength indication according to the strength of the signals received by the antenna;
a variable frequency local oscillator;
a mixer coupled for communication with the variable frequency local oscillator and the amplifier; and
a low pass filter coupled for communication with the mixer and the detector;

wherein the antenna assembly includes a channel adjust coupled for communication with the variable frequency local oscillator, and wherein:
the variable frequency local oscillator comprises a voltage-controlled oscillator, and the channel adjust comprises a rotary knob configured to be operable for adjusting the voltage-controlled oscillator; or
the variable frequency local oscillator comprises a programmable frequency synthesizer, and the channel adjust comprises a rotary encoder configured to be operable for communicating digital channel information to the programmable frequency synthesizer.

17. An antenna assembly comprising:
an antenna configured to be operable for receiving signals;
a signal level indicator for indicating a strength of signals received by the antenna;
an amplifier coupled for communication with the antenna, the signal level indicator, and a signal output, the amplifier configured to be operable for amplifying signals received by the antenna;

wherein the signal level indicator comprises:
a detector configured for communication with a display that is operable for displaying a corresponding signal strength indication according to the strength of the signals received by the antenna;
a variable frequency local oscillator;
a mixer coupled for communication with the variable frequency local oscillator and the amplifier;
a low pass filter coupled for communication with the mixer and the detector;
a channel adjust coupled for communication with the variable frequency local oscillator, the channel adjust comprising capacitive type up/down push buttons or a rotary optical encoder; and
a digital channel number display configured to be operable for digitally displaying a numeric channel number selected via the channel adjust.

18. An antenna assembly comprising:
an antenna configured to be operable for receiving signals;
a signal level indicator for indicating a strength of signals received by the antenna;
an amplifier coupled for communication with the antenna, the signal level indicator, and a signal output, the amplifier configured to be operable for amplifying signals received by the antenna;

wherein the signal level indicator comprises:
a detector configured for communication with a display that is operable for displaying a corresponding signal strength indication according to the strength of the signals received by the antenna;
a variable frequency local oscillator;
a mixer coupled for communication with the variable frequency local oscillator and the amplifier;
a low pass filter coupled for communication with the mixer and the detector;
an infrared/radio frequency receiver coupled for communication with the variable frequency local oscillator, the infrared/radio frequency receiver configured for communication with an infrared/radio frequency remote control; and
a digital channel number display configured to be operable for digitally displaying a numeric channel number selected via the infrared/radio frequency remote control.

19. An antenna assembly comprising:
an antenna configured to be operable for receiving signals;
a signal level indicator for indicating a strength of signals received by the antenna;
an amplifier coupled for communication with the antenna, the signal level indicator, and a signal output, the amplifier configured to be operable for amplifying signals received by the antenna;

wherein the signal level indicator comprises:
a detector configured for communication with a display that is operable for displaying a corresponding signal strength indication according to the strength of the signals received by the antenna;
a variable frequency local oscillator;
a mixer coupled for communication with the variable frequency local oscillator and the amplifier; and
a low pass filter coupled for communication with the mixer and the detector;

wherein:
the signal level indicator includes a looping stepped channel control coupled for communication with the variable frequency local oscillator; and
the antenna assembly is configured to be operable for generating a control signal that steps a channel adjust signal digitally through allowable channels in a repetitive loop with a dwell time on each channel sufficient to allow the detector to obtain a reading of the signal level, whereby the signal level reading is deliverable to the display along with output of the detector for displaying a spectrum bar graph of signal level for all available channels, and whereby the spectrum bar graph is usable for finding an antenna position and orientation that optimizes reception of more than a single available channel.

20. The antenna assembly of claim 19, wherein:

the signal level indicator integrally includes the display configured to be operable for displaying the spectrum bar graph of signal level for all available channels; or the signal level indicator includes a processor coupled for communication with the detector and the looping stepped channel control, the processor configured for communication with an external electronic device having a display that is operable for displaying the spectrum bar graph of signal level for all available channels.

\* \* \* \* \*